United States Patent
Raphael

[11] Patent Number: 5,286,114
[45] Date of Patent: Feb. 15, 1994

[54] HYDROSTATIC THRUST BEARING

[75] Inventor: Ernst Raphael, Bochum, Fed. Rep. of Germany

[73] Assignee: Jahnel-Kestermann Getriebewerke Bochum GmbH, Bochum, Fed. Rep. of Germany

[21] Appl. No.: 825,003

[22] Filed: Jan. 24, 1992

[51] Int. Cl.$^5$ .............................................. F16C 32/06
[52] U.S. Cl. .................................... 384/121; 384/304
[58] Field of Search ............... 384/121, 124, 304, 112, 384/123, 122

[56] References Cited

U.S. PATENT DOCUMENTS

| | | | |
|---|---|---|---|
| 3,158,415 | 11/1964 | Gardner | 384/304 |
| 3,734,581 | 5/1973 | LeBreton | 384/304 |
| 4,915,510 | 4/1990 | Arvidsson | 384/121 |
| 4,993,929 | 2/1991 | Weatherston | 384/121 |

Primary Examiner—Lenard A. Footland
Attorney, Agent, or Firm—Anderson Kill Oshinsky

[57] ABSTRACT

A hydrostatic thrust bearing includes several bearing bushings and support bushings with axial spacer sleeves and radial flanges. Pairs of pressure surfaces to which oil can be admitted are arranged one behind the other in load application direction. The pressure surfaces of each pair of pressure surfaces are arranged frontally opposite each other. The thickness of the radial flanges of the bearing bushings is smaller than the radial flanges of the support bushings. The wall thickness of the spacer sleeves of the bearing bushings increases from bearing bushing to bearing bushing. The wall thickness of the spacer sleeves of the support bushings decreases in the same direction from support bushing to support bushing. Oil-conducting bores in the radial flanges of the support bushings ensure a uniform temperature level of the bearing bushings and support bushings.

7 Claims, 2 Drawing Sheets

HYDROSTATIC THRUST BEARING

BACKGROUND OF THE INVENTION

1. Field of the Invention

The present invention relates to a hydrostatic thrust bearing. The thrust bearing has at least two pairs of pressure surfaces to which oil can be applied and which are arranged spaced-apart one behind the other in the direction of load application. Each pair of pressure surfaces includes two pressure surfaces which are located frontally opposite each other, wherein one of the pressure surfaces is provided on an end face of an outwardly directed radial flange of a bearing bushing mounted on a shaft, while the other of the pressure surfaces is located on the end face of an inwardly directed radial flange of a support bushing on an abutment side. The bearing bushings are provided with axial spacer sleeves which are directed in one direction and the support bushings are provided with axial spacer sleeves which are directed in the opposite direction.

2. Description of the Related Art

Hydrostatic thrust bearings have a high load-bearing capacity and provide an operation which is almost entirely free of wear. In addition, contrary to hydrodynamic bearings, thrust bearings make possible an operation at low rates of rotation while the friction is negligibly small. Additional important features are high stiffness and low play.

Although hydrostatic thrust bearings must be supplied with pressure oil, they are preferred over roller-type bearings, particularly if a high power density at low wear is required. This is the case, for example, in bearings of machine tools, but also in the manufacture of heavy machinery where the bearings are not easily accessible and, therefore, can only be exchanged by means of expensive operations. Consequently, hydrostatic thrust bearings are frequently integrated in the drives of double-worm extruders. In these extruders, the thrust bearings primarily serve to absorb the axial pressures resulting from the extrusion process.

The load-bearing capacity of a hydrostatic thrust bearing depends on the size of the pressure surfaces and on the pressure in the foil cushion between the pressure surfaces. Consequently, there are in principle two possibilities for increasing the load-bearing capacity of thrust bearings. One possibility is to increase the oil pressure in the system and the other possibility is seen in increasing the size of the pressure surfaces. In view of the fact that the increase of the oil pressure is limited by the technology of the available hydraulic systems, increasing the size of the pressure surfaces is the only feasible possibility. However, the size of the pressure surfaces cannot also be increased indefinitely because of practical requirements, for example, in the case of shafts which are arranged parallel to each other, the radial dimension of the thrust bearing is inevitably subject to spatial limitations.

It is apparent from the above that another solution is to arrange several pairs of pressure surfaces spaced apart one behind the other in the direction of axial load application of the thrust bearings. However, this means that it must be ensured that the total load is distributed proportionally in accordance with the sizes of the individual pressure surfaces in order to avoid pressure differences between the various oil cushions. Consequently, it must be ensured that the thicknesses of the oil cushions, i.e., the gaps between oppositely located pressure surfaces of pairs of pressure surfaces, are the same in all pairs of pressure surfaces of a thrust bearing.

When using the manufacturing technologies available at present, this requirement cannot be met without significant problems when manufacturing a thrust bearing. Additional difficulties result from operationally caused different thermal and elastic deformations in the individual bearing stages, with the result that the axial spacings between the pressure surfaces of a pair of pressure surfaces vary in radial direction.

German Offenlegunsschrift 21 13 250 discloses a proposal in which the above-mentioned problems are to be solved by means of a manufacturing solution by appropriate tolerances of the gap widths of the pairs of pressure surfaces arranged one behind the other in the direction of load application of a thrust bearing. For this purpose, it is proposed to differentiate the support widths of the sliding surfaces of bearing bushings arranged one behind the other on a shaft relative to the constant support widths of the sliding surfaces of the support bushings on the abutment side, so that bearing gaps with different sizes are provided.

However, the proposal of German Offenlegungsschrift 21 13 250 has various disadvantages. One disadvantage is the fact that it is not possible to achieve a compensation between the radially inner gap width and the radially outer gap width of each pair of pressure surfaces. Another disadvantage is the fact that different gap widths in the partial load range make it necessary to use loss-producing throttles in the oil supplied to the individual pairs of pressure surfaces or oil cushions, so that discharge of the oil through the gap with the greatest width is avoided. Moreover, the proposed differentiation of the support widths requires such narrow tolerances in the micrometer range of the axial length of a pressure stage formed by a bearing bushing and a support bushing which cannot be achieved with economically acceptable costs. Also, the known proposal does not take into consideration differing temperatures of the bearing bushings and the support bushings, so that deformation differences cannot be avoided. Finally, deformation differences can also result from the use of materials having different thermal expansions.

SUMMARY OF THE INVENTION

Therefore, it is the object of the present invention to improve a hydrostatic thrust bearing of the type described above in such a way that in any load application occurring during operation, the gap widths of all pairs of pressure surfaces are identical over the entire radial expansion thereof.

In accordance with the present invention, the above object is met by dimensioning the thickness of the radial flanges of the bearing bushings smaller than the thickness of the radial flanges of the support bushings, wherein the wall thickness of the spacer sleeves of the bearing bushings increases from bearing bushing to bearing bushing, and wherein the wall thickness of the spacer sleeves of the support bushings decreases in the same direction from support bushing to support bushing.

As a result of the configuration of the present invention, it is now possible to construct a hydrostatic thrust bearing with at least two pairs of pressure surfaces which are arranged spaced apart one behind the other and to which oil can be admitted, such that with any load application on the thrust bearing, all sealing gaps formed by oppositely located pressure surfaces of pairs of pressure surfaces have the same oil flow therethrough. Since the thickness of the radial flanges of the bearing bushings is smaller than the thickness of the radial flanges of the support bushings, and the wall thickness of the spacer sleeves of the bearing bushings decrease from bearing bushing to bearing bushing and the wall thickness of the spacer sleeves of the support bushings decreases in the same direction from support bushing to support bushing, the structural components of the thrust bearing which determine the sealing gaps can be constructed in such a way that the stiffnesses thereof influence the unavoidable elastic deformations in such a way that all inner and outer sealing gaps always have an identical gap in all conditions of operation. This results in an essentially identical oil flow in all sealing gaps. This provides the particular advantage that all pairs of pressure surfaces are subjected to the same loads without having to provide measures for ensuring that all pairs of pressure surfaces maintain their function. The invention further makes it possible that all pairs of pressure surfaces are subjected to the same pressure, so that the sealing gaps can be considered a communicating hydraulic system. As a result of the features of the present invention, the peripheral units for providing the pressure oil can be made smaller and simpler. Also, compared to thrust bearings known in the art, substantially lower oil pressures are needed.

In accordance with another feature of the present invention, the radial flanges of the bearing bushings and support bushings have annular surfaces located remote from the pressure surfaces, wherein a bearing bushing and a support bushing whose annular surfaces are located frontally opposite each other have an identical axial length. As a result of this configuration, it is possible that each pair of bearing bushings and support bushings whose annular surfaces are located frontally opposite each other can be processed together. Consequently, an identical length can be ensured on the known processing machine. The axial length of each individual pair is insignificant. It is easily possible that the axial length of one pair deviates from the axial length of an adjacent pair. It is only important that each pair of bearing bushing and support bushing has the same length.

In accordance with the present invention, the inner diameter of the spacer sleeve of the bearing bushings is greater than the inner diameter of the respective shaft bores. The purpose of this feature is to adapt as much as possible the bending-elastic properties of the radial flanges of the bearing bushings to each other. Thus, by differently dimensioning the inner diameter of the spacer sleeve and the inner diameters of the shaft bores, the bending elasticity of each radial flange of the bearing bushings can be specifically adapted in dependence on the difference between the outer diameters thereof and the outer diameters of the spacer sleeves.

In accordance with another feature of the invention, the outer diameter of the spacer sleeves of the support bushings is smaller than the outer diameter of the respective radial flange. As a result, the bending elasticity of the radial flanges can also be exactly dimensioned.

Another feature of the present invention provides that the transitions from the spacer sleeves of the bearing bushings to the radial flanges are rounded. The rounded transitions prevent local peak stresses and, thus, increase the service life of the components.

In accordance with another feature of the invention, oil-conducting bores are provided in the radial flanges of the support bushings, wherein the oil-conducting bores are in communication with portions defined by the spacer sleeves of the support bushings and the radial flanges thereof as well as the radial flanges of the bearing bushings. As a result, the thermal deformations between the bearing bushings and the support bushings resulting from operation are eliminated and it is ensured that any resulting length differences between the pairs of corresponding bearing bushings and support bushings are compensated. Thus, the oil-conducting bores provided in the support bushings ensure that the oil heated by pressure release in the sealing gaps is uniformly distributed over all radial flanges of the support bushings, so that the bearing bushings which are located on the inside and the support bushings located on the outside are maintained essentially at the same temperature level.

The present invention further provides that the circumferential surfaces of the radial flanges of the bearing bushings are constructed at least partially conically radially inwardly inclined in direction toward the corresponding spacer sleeves. The conical configuration of the radial flanges of the bearing bushings provides the advantage that the flow cross-section for the oil is sufficiently large. As a result, any oil retention on the lowpressure side is avoided without jeopardizing the stiffness of the bearing bushings.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
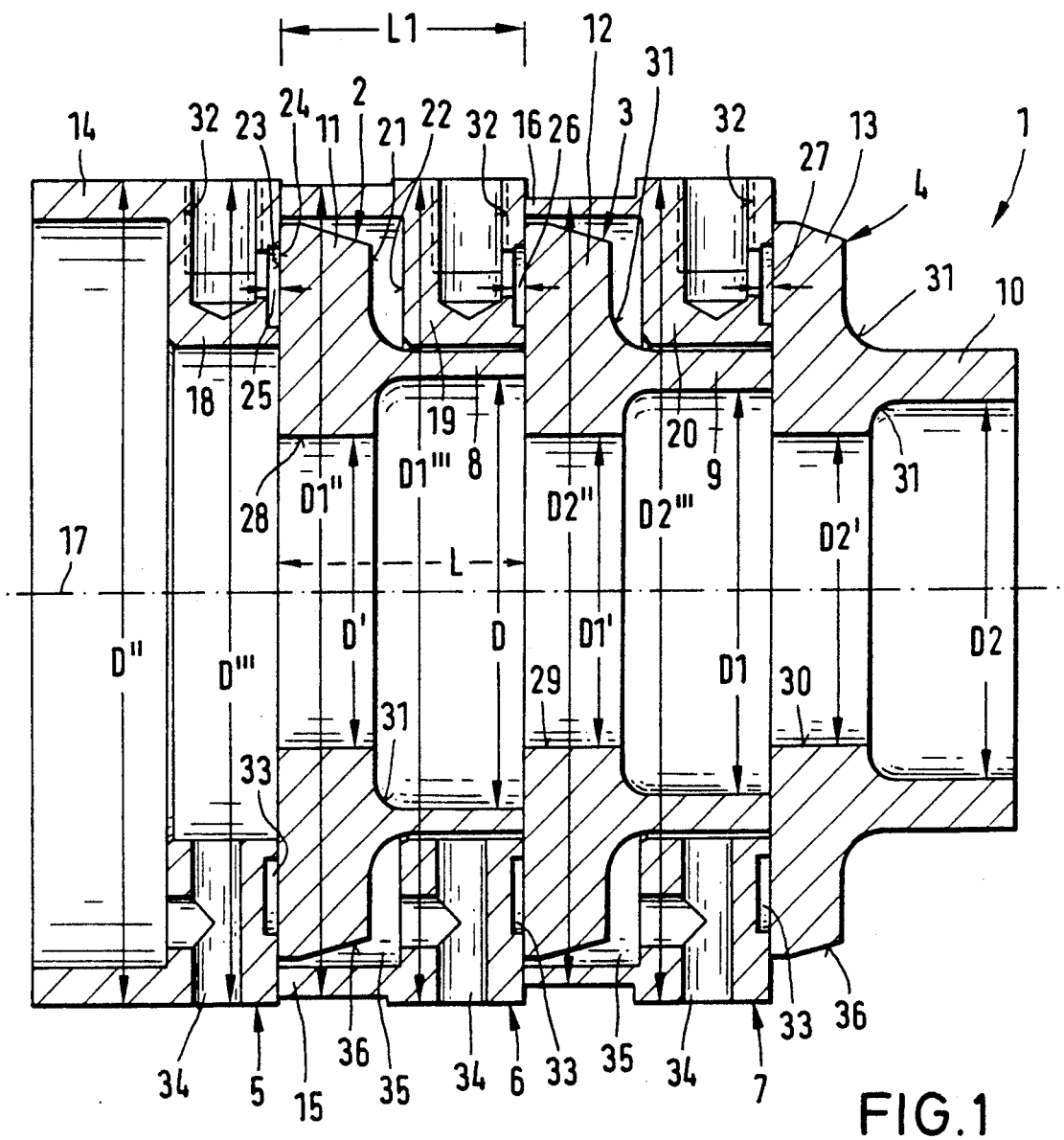
FIG. 1 is a schematic vertical sectional view of a thrust bearing according to the present invention.
Figure 2:
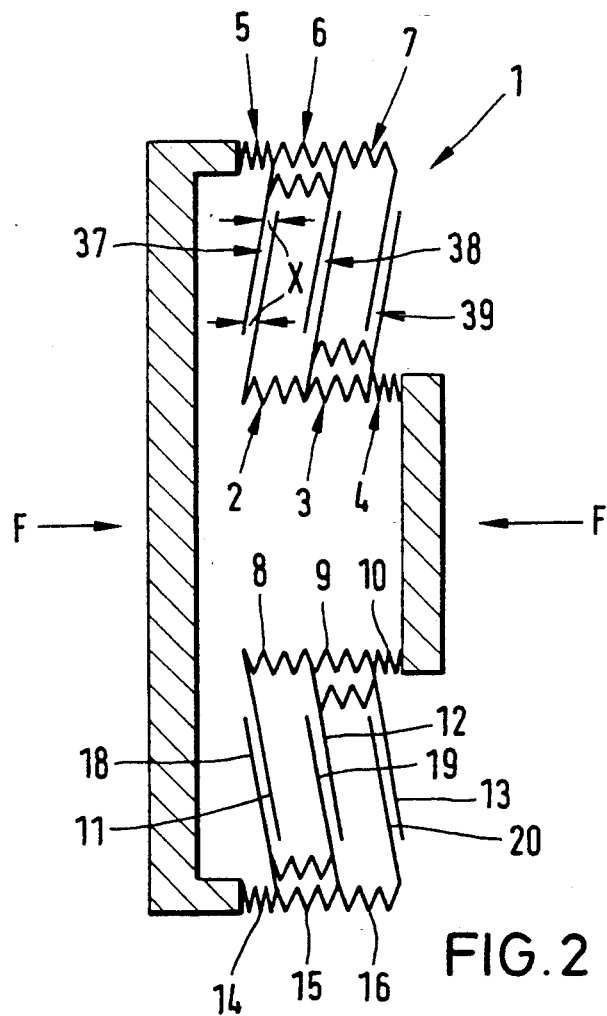
FIG. 2 shows an elastic model of the thrust bearing of FIG. 1.

FIGS. 1 and 2 of the drawing show a hydrostatic thrust bearing 1 which may be used, for example, in a drive of a double-worm extruder for absorbing the axial pressures F resulting from an extrusion process.

In the illustrated embodiment, the thrust bearing 1 has altogether three bearing bushings 2, 3, 4 mounted on a shaft and three support bushings 5, 6, 7 on an abutment.

The bearing bushings 2, 3, 4 have axial spacer sleeves 8, 9, 10 which are directed in the same direction and radial flanges 11, 12, 13 which extend outwardly and at a right angle to the spacer sleeves 8, 9, 10.

The support bushings 5, 6, 7 also have axial spacer sleeves 14, 15, 16 as well as radial flanges 18, 19, 20 which extend at a right angle, but are directed toward the shaft axis 17. The spacer sleeves 14, 15, 16 of the support bushings 5, 6, 7 are directed in the opposite direction of the spacer sleeves 8, 9, 10 of the bearing bushings 2, 3, 4.

As can be seen in FIG. 1, the thickness of the radial flanges 11, 12, 13 of the bearing bushings 2, 3, 4 is smaller than the thickness of the radial flanges 18, 19, 20 of the support bushings 5, 6, 7. It is further shown in FIG. 1 that the wall thickness of the spacer sleeves 8, 9, 10 of the bearing bushings 2, 3, 4 increases from bearing bushing 2 to bearing bushing 4 and that the wall thickness of the spacer sleeves 14, 15, 16 of the support bushings 5, 6, 7 decreases in the same direction from support bushing 5 to support bushing 7. The thickness of the radial flanges 18, 19, 20 increases from support bushing 5 to support bushing 7, while the thickness of the radial flanges 18, 12, 13 decreases in the same direction from bearing bushing 2 to bearing bushing 4.

Always one bearing bushing and one support bushing are arranged in pairs and nested one into the other. For example, bearing bushing 2 is nested in support bushing 6. The radial flanges 11 and 19 have annular surfaces 21 and 22, respectively, which are located frontally opposite each other. The axial length L of bearing bushing 2 is identical to the axial length L1 of the support bushing 6. In addition, FIG. 1 of the drawing shows that pairs 25, 26, 27 of pressure surfaces to which oil can be admitted are formed by frontally oppositely located pressure surfaces 23, of the bearing bushings 2, 3, 4 and 14 of the support bushings 14, 15, 16.

The spacer sleeves 8 and 9 of the bearing bushings 2 and 3 rest against end faces 23 of adjacent radial flanges 12, 13, while the spacer sleeves 15, 16 of the support bushing 6, 7 rest against end faces 24 of the respectively adjacent radial flanges 18, 19.

The inner diameter D, D1, D2 of the spacer sleeves 8, 9, 10 of the bearing bushings 2, 3, 4 is greater than the inner diameter D', D1', D2' of the respective shaft bores 28, 29, 30. Similarly, the outer diameter D'', D1'', D2'' of the spacer sleeves 14, 15, 16 of the support bushing 5, 6, 7 is smaller than the outer diameter D''', D1''', D2''' of the respective radial flanges 18, 19, 20.

The transitions 31 from the spacer sleeves 8, 9, 10 of the bearing bushings 2, 3, 4 to the radial flanges 11, 12, 13 are rounded in order to prevent peak stresses.

Threaded bores 32 extend in radial direction in the radial flanges 18, 19, 20 of the thrust support bushings 5, 6, 7. Pressure oil supplied from a pressure oil supply unit, not shown, is conducted through the threaded bores 32 into annular recesses 33 in the pressure surfaces 24 of the support bushings 5, 6, 7. A plurality of oil-conducting bores 34 are provided in the radial flanges 18, 19, 20 of the support bushings 5, 6, 7. The oil-conducting bores 34 are distributed over the circumference of the radial flanges 18, 19, 20 and, in the illustrated embodiment, are T-shaped. The oil-conducting bores 34 are in communication with portions 35 defined by the spacer sleeves 14, 15, 16 of the support bushings 5, 6, 7 and the radial flanges 18, 19, 20 thereof as well as the radial flanges 11, 12, 13 of the bearing bushings 2, 3, 4.

Finally, FIG. 1 further shows that the circumferential surfaces 36 of the radial flanges 11, 12, 13 of the bearing bushings 2, 3, 4 are at least partially conically inclined toward the spacer sleeves 8, 9, 10.

It is apparent from considering FIGS. 1 and 2 together that the illustrated hydrostatic thrust bearing 1 is constructed such that the same oil passage takes place at any load condition in all sealing gaps 37, 38, 39 between the bearing bushings 2, 3, 4 and the support bushings 5, 6, 7. The oil-conducting bores 34 additionally ensure that the temperature level of the bearing bushings 2, 3, 4 is the same as that of the support bushings 5, 6, 7.

Deformation differences of the bearing bushings 2, 3, 4 relative to the support bushings 5, 6, 7 are compensated by the configuration of the spacer sleeves 8, 9, 10 of the bearing bushings 2, 3, 4, of the spacer sleeves 14, 15, 16 of the support bushings 5, 6, 7 as well as of the radial flanges 11, 12, 13 of the bearing bushings 2, 3, 4 and the radial flanges 18, 19, 20 of the support bushings 5, 6, 7. This compensation is obtained with respect to the compression deformation in the spacer sleeves 8, 9, 10 and 14, 15, 16 as well as with respect to the bending deformation in the radial flanges 11, 12, 13 and 18, 19, 20 gap height X at the outer rim and the inner rim of each pair 25, 26, 27 of pressure surfaces. This is particularly evident from FIG. 2. Accordingly, the radial flanges 18, 19, 20 of the support bushings 5, 6, 7 are thicker than the radial flanges 11, 12, 13 of the bearing bushings 2, 3, 4 because the stiffening effect of a flange decreases with increasing diameter. FIG. 2 shows in this connection that the above-mentioned feature results in equal gap heights X in each sealing gap 37, 38, 39 independently of the load.

While specific embodiments of the invention have been shown and described in detail to illustrate the application of the inventive principles, it will be understood that the invention may be embodied otherwise without departing from such principles.

I claim:

1. In a hydrostatic thrust bearing adapted for mounting on a shaft, the thrust bearing including at least two bearing bushings facing the shaft, each bearing bushing having an outwardly directed radial flange, each radial flange having an end face with a pressure surface, and at least two support bushings on an abutment side, each support bushing having an inwardly directed radial flange, each radial flange of the support bushings having an end face with a pressure surface, wherein a pressure surface of a bearing bushing is located frontally opposite a pressure surface of an adjacently located support bushing so as to form a pair of pressure surfaces to which oil can be admitted, and wherein the bearing bushings have spacer sleeves extending in one axial direction and the support bushings have spacer sleeves extending in an opposite axial direction, the radial flanges having a thickness and the spacer sleeves having a wall thickness, the improvement comprising the thickness of the radial flanges of the bearing bushings being smaller than the thickness of the radial flanges of the support bushings, the wall thickness of the spacer sleeves of the bearing bushings increasing from bearing bushing to bearing bushing in axial direction and the wall thickness of the spacer sleeves of the support bushings decreasing in the same axial direction from support bushing to support bushing.

2. The thrust bearing according to claim 1, wherein each radial flange has an annular surface axially remote from the pressure surface, wherein bearing bushings and support bushings whose annular surfaces are located frontally opposite each other have the same axial length.

3. The thrust bearing according to claim 2, wherein the spacer sleeves of the bearing bushings have an inner diameter and the bearing bushings have shaft bores with an inner diameter, and wherein the inner diameter of the spacer sleeves of the bearing bushings is greater than the inner diameter of the shaft bore.

4. The thrust bearing according to claim 2, wherein the spacer sleeves of the support bushings have an outer diameter and the radial flanges of the support bushings have an outer diameter, and wherein the outer diameter of each spacer sleeve of the support bushings is smaller than the outer diameter of the radial flange of the bearing bushing.

5. The thrust bearing according to claim 1, comprising rounded transitions between the spacer sleeves of the bearing bushings and the radial flanges of the bearing bushings.

6. The thrust bearing according to claim 1, wherein the radial flanges of the support bushings have oil-conducting bores, the oil-conducting bores being in communication with portions defined by the spacer sleeves of the support bushings and the radial flanges of the support bushings and by the radial flanges of the bearing bushings.

7. The thrust bearing according to claim 1, wherein the radial flanges of the bearing bushings have circumferential surfaces, the circumferential surfaces being at least partially conically inclined in direction toward the spacer sleeves of the bearing bushings.

* * * * *